US012625533B2

(12) United States Patent
Kawasaki et al.

(10) Patent No.: US 12,625,533 B2
(45) Date of Patent: May 12, 2026

(54) SETTING EXECUTION MODE FOR ELECTRONIC CONTROL UNITS BASED ON REMAINING BATTERY LEVEL AFTER STOPPING VEHICLE

(71) Applicants: TOYOTA JIDOSHA KABUSHIKI KAISHA, Toyota (JP); DENSO TEN Limited, Kobe (JP)

(72) Inventors: Hiroki Kawasaki, Toyota (JP); Noriaki Ito, Toyota (JP); Hiroto Nakagawa, Nagoya (JP); Satoru Ikeda, Kobe (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 115 days.

(21) Appl. No.: 17/948,552

(22) Filed: Sep. 20, 2022

(65) Prior Publication Data

US 2023/0088041 A1     Mar. 23, 2023

(30) Foreign Application Priority Data

Sep. 21, 2021     (JP) ................................. 2021-153653

(51) Int. Cl.
G06F 1/26          (2006.01)
G07C 5/02          (2006.01)

(52) U.S. Cl.
CPC ............... G06F 1/263 (2013.01); G07C 5/02 (2013.01)

(58) Field of Classification Search
CPC ......... G06F 1/263; G06F 1/3287; G07C 5/02; B60L 2240/622; B60L 2260/26; B60L 3/04; B60L 53/68; B60L 58/12
See application file for complete search history.

(56) References Cited

U.S. PATENT DOCUMENTS

| | | | | |
|---|---|---|---|---|
| 7,701,167 B2 * | 4/2010 | Yamaguchi | ............... | H02J 1/14 |
| | | | | 713/320 |
| 9,283,953 B2 * | 3/2016 | Suzuki | ................... | B60W 10/08 |
| 2002/0043072 A1 * | 4/2002 | Hamachi | .............. | B60H 1/3222 |
| | | | | 62/133 |
| 2007/0194748 A1 | 8/2007 | Yamaguchi | | |
| 2008/0067973 A1 * | 3/2008 | Ishikawa | ............... | B60W 20/50 |
| | | | | 318/139 |
| 2014/0244104 A1 * | 8/2014 | Tan | ...................... | H04B 1/3822 |
| | | | | 701/36 |
| 2014/0278439 A1 * | 9/2014 | Rajagopal | ............... | G10L 15/01 |
| | | | | 704/275 |
| 2015/0116336 A1 * | 4/2015 | Yoshimura | ............ | G06F 1/3265 |
| | | | | 345/520 |

(Continued)

FOREIGN PATENT DOCUMENTS

| | | |
|---|---|---|
| CN | 111399405 A | 7/2020 |
| JP | 2010-186253 A | 8/2010 |

(Continued)

*Primary Examiner* — Danny Chan
(74) *Attorney, Agent, or Firm* — Sughrue Mion, PLLC

(57)          ABSTRACT

This disclosure reduces power consumption of a vehicle. An information processing apparatus of this disclosure acquires information on a remaining battery level of a vehicle. The information processing apparatus determines, for each of multiple types of processing executed by one or more electronic control units of the vehicle, an execution mode to be set after a running system of the vehicle stops, according to the remaining battery level.

18 Claims, 11 Drawing Sheets

MODE LIST

| | | DCM 100 | | | | ECU 200B | | ECU 200C | |
|---|---|---|---|---|---|---|---|---|---|
| | | EMERGENCY ALERT | SECURITY | REMOTE CONTROL | ... | FUNCTION B1 | FUNCTION B2 | FUNCTION C1 | FUNCTION C2 |
| REMAINING BATTERY LEVEL | 80–100% | NORMAL | NORMAL | NORMAL | ... | NORMAL | NORMAL | NORMAL | NORMAL |
| | 50–80% | NORMAL | NORMAL | NORMAL | ... | NORMAL | NORMAL | NORMAL | NORMAL |
| | 20–50% | NORMAL | NORMAL | NORMAL | ... | NORMAL | SUSPENDED | NORMAL | SUSPENDED |
| | 0–20% | NORMAL | SUSPENDED | SUSPENDED | ... | SUSPENDED | SUSPENDED | SUSPENDED | SUSPENDED |

(56)  References Cited

U.S. PATENT DOCUMENTS

| | | | |
|---|---|---|---|
| 2015/0344039 A1* | 12/2015 | Amoh | H01L 23/62 |
| | | | 701/1 |
| 2017/0170951 A1* | 6/2017 | Ito | H04L 12/40 |
| 2018/0232037 A1* | 8/2018 | Darin | G06F 3/0685 |
| 2018/0308293 A1* | 10/2018 | DeCia | H04N 7/181 |
| 2019/0250903 A1* | 8/2019 | Seki | G06F 9/445 |
| 2020/0052639 A1* | 2/2020 | Ishida | H02K 3/12 |
| 2022/0171612 A1* | 6/2022 | Goto | G06F 9/45533 |
| 2022/0185183 A1* | 6/2022 | Kida | B60R 1/27 |
| 2022/0398874 A1* | 12/2022 | Hizaki | G07C 5/008 |
| 2023/0066445 A1* | 3/2023 | Sanji | H04W 64/003 |
| 2023/0286464 A1* | 9/2023 | Asai | B60R 25/245 |
| 2023/0373530 A1* | 11/2023 | Kume | G08G 1/16 |
| 2024/0028692 A1* | 1/2024 | Liao | H04L 9/3247 |

FOREIGN PATENT DOCUMENTS

| | | | |
|---|---|---|---|
| JP | 2015-174552 A | 10/2015 |
| WO | 2014/162886 A1 | 10/2014 |

* cited by examiner

Fig. 3A

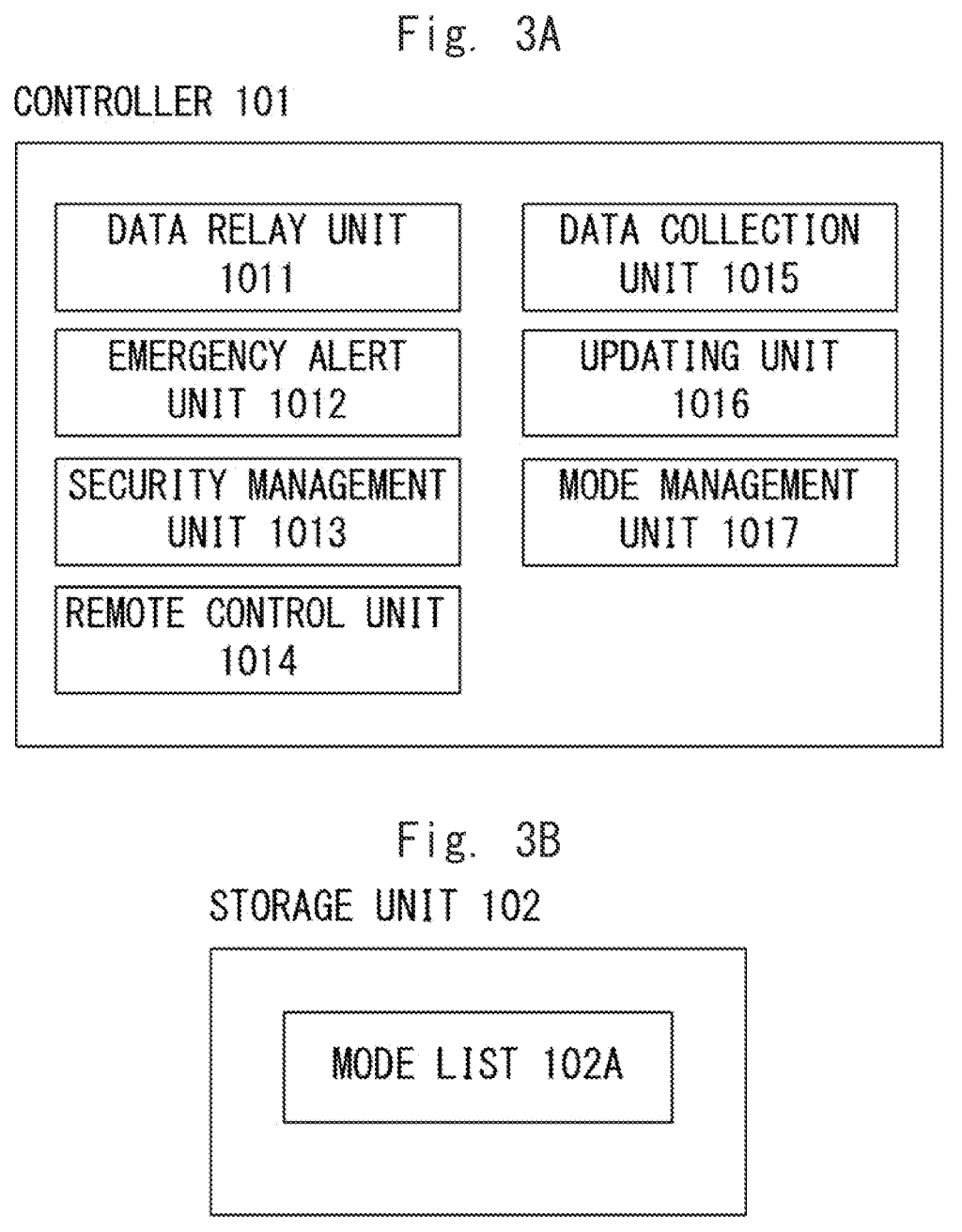

CONTROLLER 101

| DATA RELAY UNIT 1011 | DATA COLLECTION UNIT 1015 |
|---|---|
| EMERGENCY ALERT UNIT 1012 | UPDATING UNIT 1016 |
| SECURITY MANAGEMENT UNIT 1013 | MODE MANAGEMENT UNIT 1017 |
| REMOTE CONTROL UNIT 1014 | |

Fig. 3B

STORAGE UNIT 102

MODE LIST 102A

Fig. 4

MODE LIST

| REMAINING BATTERY LEVEL | FUNCTION | | | | | |
|---|---|---|---|---|---|---|
| | EMERGENCY ALERT | SECURITY | REMOTE CONTROL | VEHICLE DATA COLLECTION/TRANSMISSION | SOFTWARE UPDATE | ⋮ |
| 80-100% | NORMAL | NORMAL | NORMAL | NORMAL | NORMAL | ⋮ |
| 50-80% | NORMAL | NORMAL | NORMAL | NORMAL | SUSPENDED | ⋮ |
| 20-50% | NORMAL | NORMAL | NORMAL | SUSPENDED | SUSPENDED | ⋮ |
| 0-20% | NORMAL | SUSPENDED | SUSPENDED | SUSPENDED | SUSPENDED | ⋮ |

Fig. 6A

EXAMPLE OF POWER SAVING MODE

| EXECUTION MODE | DETAILS |
|---|---|
| INTERMITTENT | REDUCE PROCESSING CYCLE |
| LOW-LOAD | REDUCE AMOUNT OF PROCESSING PERFORMED AT ONCE |
| SHORT | SHORTEN DURATION OF PROCESSING |
| ... | ... |

MODE LIST

| | | DATA TYPE | | | | |
|---|---|---|---|---|---|---|
| | | EMERGENCY ALERT-RELATED DATA | SECURITY-RELATED DATA | REMOTE CONTROL-RELATED DATA | VEHICLE DATA | SOFTWARE UPDATE-RELATED DATA | |
| REMAINING BATTERY LEVEL | 80–100% | PERMIT | PERMIT | PERMIT | PERMIT | PERMIT | ⋮ |
| | 50–80% | PERMIT | PERMIT | PERMIT | PERMIT | BLOCK | ⋮ |
| | 20–50% | PERMIT | PERMIT | PERMIT | BLOCK | BLOCK | ⋮ |
| | 0–20% | PERMIT | BLOCK | BLOCK | BLOCK | BLOCK | ⋮ |

Fig. 9

MODE LIST

| REMAINING BATTERY LEVEL | DCM 100 | | | | ECU 200B | | ECU 200C | |
|---|---|---|---|---|---|---|---|---|
| | EMERGENCY ALERT | SECURITY | REMOTE CONTROL | ... | FUNCTION B1 | FUNCTION B2 | FUNCTION C1 | FUNCTION C2 |
| 80-100% | NORMAL | NORMAL | NORMAL | ... | NORMAL | NORMAL | NORMAL | NORMAL |
| 50-80% | NORMAL | NORMAL | NORMAL | ... | NORMAL | NORMAL | NORMAL | NORMAL |
| 20-50% | NORMAL | NORMAL | NORMAL | ... | NORMAL | SUSPENDED | NORMAL | SUSPENDED |
| 0-20% | NORMAL | SUSPENDED | SUSPENDED | ... | SUSPENDED | SUSPENDED | SUSPENDED | SUSPENDED |

SETTING EXECUTION MODE FOR ELECTRONIC CONTROL UNITS BASED ON REMAINING BATTERY LEVEL AFTER STOPPING VEHICLE

CROSS-REFERENCE TO THE RELATED APPLICATION

This application claims the benefit of Japanese Patent Application No. 2021-153653, filed on Sep. 21, 2021, which is hereby incorporated by reference herein in its entirety.

BACKGROUND

Technical Field

This disclosure relates to vehicle control.

Description of the Related Art

There are technologies for reducing the consumption of batteries of vehicles. In relation to this, for example, Japanese Patent Laid-Open No. 2010-186253 discloses a vehicle system in which in-vehicle equipment switches to a power-saving mode depending on the remaining battery level of the vehicle.

[Patent document 1] Japanese Patent Laid-Open No. 2010-186253.

SUMMARY

One or more aspects of this disclosure are directed to reduce power consumption of a vehicle.

An aspect of an embodiment of this disclosure may be an information processing apparatus including a controller including at least one processor configured to acquire information on a remaining battery level of a vehicle, and determine, for each of multiple types of processing executed by one or more electronic control units of the vehicle, an execution mode to be set after a running system of the vehicle stops, according to the remaining battery level.

An aspect of an embodiment of this disclosure may be a vehicle system including a first apparatus configured to perform multiple types of processing related to a vehicle and a second apparatus configured to acquire information on a remaining battery level of the vehicle, in which the second apparatus transmits the information on the remaining battery level of the vehicle to the first apparatus, and the first apparatus determines, for each of multiple types of processing executed by one or more electronic control units of the vehicle, an execution mode to be set after a running system of the vehicle stops, according to the remaining battery level.

An aspect of an embodiment of this disclosure may be an information processing method including acquiring information on a remaining battery level of a vehicle, and determining, for each of multiple types of processing executed by one or more electronic control units of the vehicle, an execution mode to be set after a running system of the vehicle stops, according to the remaining battery level.

According to this disclosure, power consumption of a vehicle can be reduced.

BRIEF DESCRIPTION OF THE DRAWINGS

FIG. 3A is a schematic diagram illustrating functional modules of a controller;

FIG. 3B is a schematic diagram illustrating data stored in a storage unit;

FIG. 4 illustrates an example of a mode list in the first embodiment;

FIG. 6A illustrates an example of a power-saving mode in the first embodiment;

FIG. 7 is a flowchart of processing performed by a DCM while the vehicle is parked;

FIG. 8 illustrates an example of a mode list in a second embodiment;

FIG. 9 illustrates an example of a mode list in a third embodiment; and

DESCRIPTION OF THE EMBODIMENTS

Figure 1:
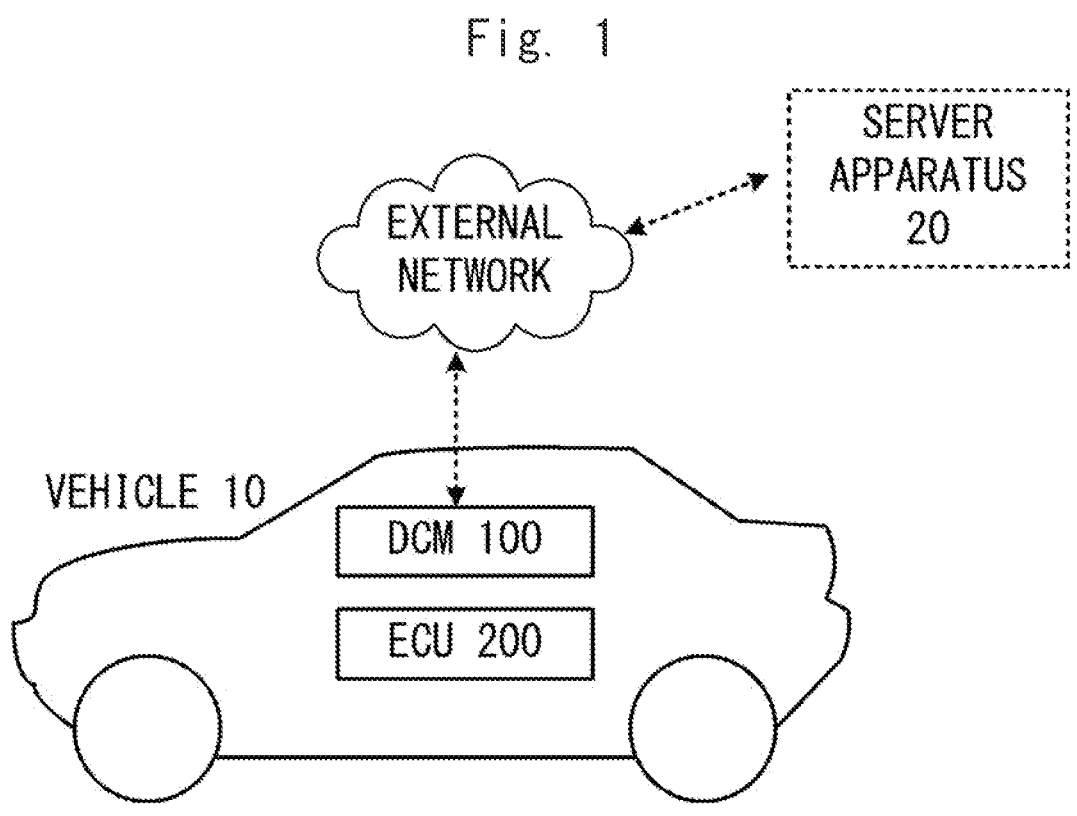
FIG. 1 is a schematic diagram of a vehicle system according to a first embodiment.

Electronic control units in a vehicle generally stop operating once a running system of the vehicle is shut down. However, with recent improvements in vehicle functionality, an increasing number of electronic control units continues to standby while the vehicle is parked. Such electronic control units include those that provide security functions, remote control functions, and emergency alert functions.

As more electronic control units remain on standby while the vehicle is parked, power consumption increases, placing a load on the battery of the vehicle.

A known countermeasure to this is to put any electronic control unit to sleep during standby according to the remaining battery level of the vehicle.

However, when the operation of the electronic control units is uniformly stopped, important functions such as security and emergency alert functions may also be stopped.

An information processing apparatus according to this disclosure solves such problems.

An information processing apparatus according to an aspect of this disclosure may include a controller that acquires information on a remaining battery level of a vehicle, and determines, for each of multiple types of processing executed by one or more electronic control units of the vehicle, an execution mode to be set after a running system of the vehicle stops, according to the remaining battery level.

The information on the remaining battery level of the vehicle is, for example, information indicating the remaining level of a battery (such as an auxiliary battery) for operating the electrical components of the vehicle. This information can be acquired, for example, from the electronic control unit managing the battery of the vehicle, of the one or more electronic control units.

The controller may determine the execution mode for each of the multiple types of processing that can be executed by the in-vehicle electronic control unit according to the remaining battery level.

The target electronic control unit may be an apparatus that is different from or same as the information processing apparatus according to this disclosure.

Examples of the execution modes include "a mode in which the execution is not permitted" and "a mode in which the execution is permitted as normal". Note that any other execution modes related to power consumption may be adopted. For example, "a mode in which communication amount is made lower than in the normal operation" and "a mode in which power consumption is made lower than in the normal operation" may be adopted.

The information processing apparatus according to this disclosure may determine the execution mode for each of multiple types of processing that can be executed by the electronic control units according to the remaining battery level of the vehicle. This makes it possible to "execute any types of processing for providing important functions regardless of the remaining battery level" and "limit relatively unimportant type of processing in an early stage to protect the battery".

Specific embodiments of this disclosure will be described below with reference to the accompanying drawings. The hardware configuration, module configuration, functional configuration, and the like described in each embodiment are not intended to limit the technical scope of the disclosure to them alone, unless otherwise stated.

First Embodiment

An overview of a vehicle system according to a first embodiment will be described with reference to FIG. 1. The vehicle system according to this embodiment includes a vehicle 10.

The vehicle 10 is a connected car that includes the ability to communicate with an external network. The vehicle 10 includes a data communication module (DCM) 100 and an electronic control unit 200 (also called electronic control unit (ECU)). Although FIG. 1 illustrates an example of a single ECU 200, the vehicle 10 may include multiple ECUs 200.

The DCM 100 is an apparatus that communicates wirelessly with an external network. The DCM 100 functions as a gateway for connecting the components of the vehicle 10 (hereinafter referred to as vehicle components) to the external network. For example, the DCM 100 provides the ECU 200 of the vehicle 10 with access to the external network. This allows a plurality of in-vehicle ECUs 200 to communicate, through the DCM 100, with external apparatuses connected to the network.

Note that the DCM 100 can also be regarded as one of the electronic control units of the vehicle 10.

Here, a server apparatus 20 is illustrated as an external apparatus.

The server apparatus 20 is an apparatus that provides a connected service to the vehicle 10. In this embodiment, the server apparatus 20 provides, for example, traffic information and infotainment-related information to the vehicle 10. The server apparatus 20 also provides a security monitoring service, a remote control service, or an emergency service provided in case of emergency, to the vehicle 10.

Figure 2:
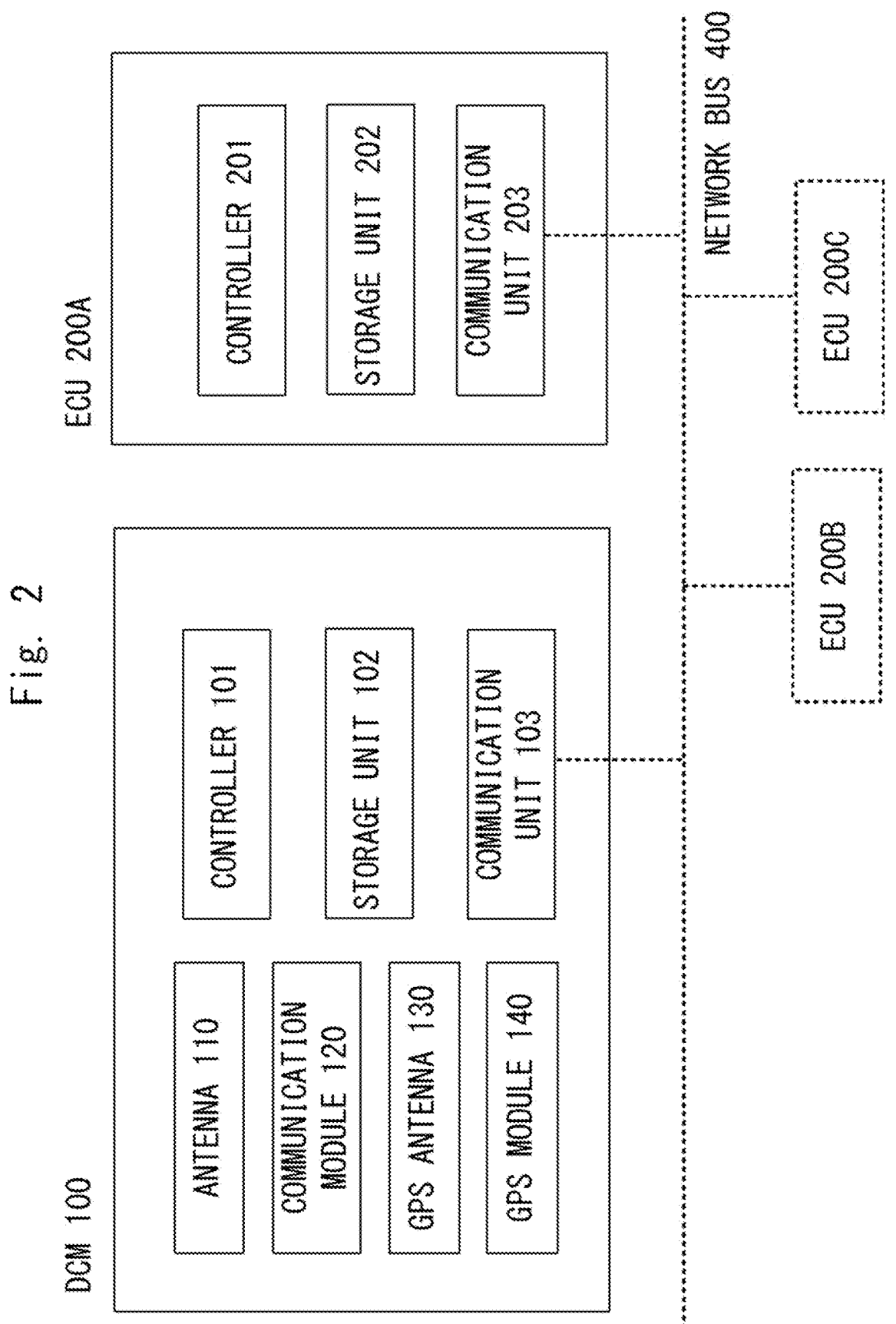
FIG. 2 is a diagram illustrating components of a vehicle 10 according to the first embodiment.

FIG. 2 illustrates the components of the vehicle 10 according to this embodiment. The vehicle 10 according to this embodiment includes the DCM 100 and multiple ECUs 200A, 200B, 200C . . . (hereinafter collectively referred to as ECU 200).

The ECU 200 may include multiple ECUs that control the respective components of the vehicle 10. Examples of the multiple ECUs include a body ECU, an engine ECU, a hybrid ECU, and a powertrain ECU. The ECUs 200 may be divided on a functional unit basis. For example, they may be classified into an ECU that executes a security function, an ECU that executes an automatic parking function, an ECU that executes a remote control function, and an ECU that executes an infotainment function.

The DCM 100 includes an antenna 110, a communication module 120, a GPS antenna 130, a GPS module 140, a controller 101, a storage unit 102, and a communication unit 103.

The antenna 110 is an antenna device used to input and output wireless signals. In this embodiment, the antenna 110 is used for mobile communication (e.g., 3G, LTE, and 5G mobile communication). Note that the antenna 110 may include multiple physical antennas. For example, in the case of mobile communication using radio waves in high frequency bands such as microwaves and millimeter waves, multiple antennas may be dispersed to stabilize communication.

The communication module 120 is a communication module for mobile communication.

The GPS antenna 130 is an antenna that receives positioning signals transmitted from positioning satellites (also referred to as GNSS satellites).

The GPS module 140 is a module that calculates location information based on signals received at the GPS antenna 130.

The controller 101 is an arithmetic unit that executes a predetermined program to achieve various functions of the DCM 100. The controller 101 may be implemented using a CPU or the like.

The controller 101 executes the function of mediating communications between the external network and the components of the vehicle 10 (hereinafter referred to as vehicle components).

The vehicle components may be ECUs 200 or other in-vehicle apparatuses (e.g., a car navigation apparatus and a head unit apparatus).

For example, when a vehicle component requires communication with the external network, the controller 101 executes the function of relaying data transmitted from that vehicle component to the external network. It also executes the function of receiving data transmitted from the external network and forwarding the data to an appropriate vehicle component.

The controller 101 can execute functions specific to its own apparatus. For example, the controller 101 is configured to be capable of executing a security system monitoring function or a call function, and can make security calls, emergency calls, or the like according to triggers that occur in the vehicle. Detailed functions will be described below.

The storage unit 102 is a memory device that includes a main memory and an auxiliary storage. The auxiliary storage stores an operating system (OS), various programs, various tables, and the like, and loads the stored program to the main memory and executes it, thereby achieving the functions appropriate for predetermined objects described below.

The communication unit 103 is an interface unit for connecting the DCM 100 to the in-vehicle network. In this embodiment, multiple vehicle components, including the electronic control units (ECUs 200), are connected to each other via an in-vehicle network bus 400. An example of the standard of the in-vehicle network is the controller area network (CAN). When the in-vehicle network uses multiple standards, the communication unit 103 may include multiple interface apparatuses compatible with the standard of the communication destination. Examples of communication standard other than CAN include Ethernet (registered trademark).

The functions executed by the controller 101 will now be explained. FIG. 3A is a schematic diagram illustrating functional modules of the controller 101. The functional modules of the controller 101 can be achieved by executing the programs stored in a ROM or other storage means through the controller 101.

A data relay unit 1011 relays data transmitted and received between the vehicle components. For example, it receives messages sent out by a first apparatus connected to the in-vehicle network and, when necessary, executes processing for forwarding the messages to a second apparatus connected to the in-vehicle network. The first and second apparatuses may be ECUs 200 or other vehicle components.

Upon reception of a message from a vehicle component that is destined for an external network, the data relay unit 1011 relays the message to the external network. It also receives data transmitted from the external network and forwards the data to an appropriate vehicle component.

An emergency alert unit 1012 makes an emergency call to an operator outside the vehicle when an abnormal situation occurs in the vehicle 10. Examples of abnormal situations include the occurrence of a traffic accident or vehicle breakdown. When a predetermined trigger, such as the pressing of a call button in the vehicle or the deployment of an airbag, occurs, the emergency alert unit 1012 initiates a connection to the operator and then enables a call between the occupant of the vehicle and the operator. Upon notification of emergency, the emergency alert unit 1012 may transmit location information of the vehicle to the operator. In this case, the emergency alert unit 1012 may acquire the location information from the GPS module 140.

A security management unit 1013 performs security monitoring processing. The security management unit 1013 detects the fact that the vehicle has been unlocked without a proper procedure based on data received from the ECU 200 that controls the electronic locking of the vehicle, and transmits a security alert to the server apparatus 20. The security management unit 1013 also detects the fact that a shock, vibration, or the like has been applied to the vehicle body based on data received from the ECU 200 that controls the body, and transmits a security alert to the server apparatus 20.

Note that the security alert may include the location information of the vehicle. In this case, the security management unit 1013 may acquire the location information from the GPS module 140. When determining that a problem has occurred with the security of its vehicle, the security management unit 1013 may acquire the location information and periodically send the acquired location information to the server apparatus 20.

The security alert may also include images of the surroundings or interior of the vehicle. In this case, the security management unit 1013 may acquire the images from an in-vehicle camera.

A remote control unit 1014 controls the operation of the components of the vehicle 10 based on requests sent from outside the vehicle 10. The components subject to remote control are typically air conditioning units, including car air conditioners, but may also be other components. For example, seat heaters, steering wheel heaters, defrosters, and the like may be subject to remote control.

The remote control unit 1014 receives a command from the external network, for example, to operate the air conditioning of the vehicle 10, and operates one of multiple air conditioning units according to the command.

A data collection unit 1015 collects predetermined data and transmits it to the server apparatus 20. The collected and transmitted data may be data related to the running of the vehicle 10. Such data (hereinafter referred to as "vehicle data") may include data representing the speed, location, travel direction, and the like of the vehicle 10. The server apparatus 20 may, for example, collect data on the running of multiple vehicles in real time, thereby performing processing that contributes to traffic safety.

The vehicle data may also be data on the surrounding environment of the vehicle 10. The server apparatus 20 can generate, for example, traffic information by collecting data on the surrounding environment from multiple vehicles.

The vehicle data may also include images captured by in-vehicle cameras and distance images. By collecting these types of data, the server apparatus 20 can generate three-dimensional road maps, for example.

An updating unit 1016 updates the software used by its apparatus (DCM 100) or the electronic control unit (ECU 200) of the vehicle 10. For example, the updating unit 1016 manages the version of the firmware stored in the multiple ECUs 200 and, when new firmware is provided by the server apparatus 20, downloads it via the network and executes processing to be applied to the target apparatus.

Here, examples of the functions provided by the DCM 100 include an emergency alert function, a security function, a remote control function, a vehicle data collection/transmission function, and a software update function as described above; however, the DCM 100 may include other functions as well. For example, the DCM 100 may include the functions of driving diagnosis, monitoring the condition of the driver, and energy management, for example.

A mode management unit 1017 controls the power saving of its apparatus. To be specific, when the vehicle 10 is parked, it acquires information on the remaining battery level of the vehicle, and based on the remaining battery level, assigns an execution mode for each of the multiple functions (multiple functional modules) that can be provided by its apparatus.

The remaining battery level is, for example, the remaining level of a battery (such as an auxiliary battery) for operating the electrical components of the vehicle, but may also be the remaining level of a drive battery.

The execution mode is a mode for specifying the operation of multiple functional modules, and examples include "normal mode", "sleep mode", and "power-saving mode".

The normal mode is a mode in which normal operation is performed, and the sleep mode is a mode in which power consumption is minimized by suspending the execution of processing.

The power-saving mode is a mode in which power consumption is reduced by limiting some of the functions. The power saving mode may be divided into a mode for reducing the execution frequency of processing, a mode for reducing the execution time of processing, a mode for reducing the frequency of communication with external apparatuses, a mode for reducing the amount of data for communication, and the like.

Each functional module operates according to the assigned execution mode. For example, when the execution mode assigned to a functional module is "suspended," the functional module stops processing for providing the function.

When the execution mode assigned to the functional module is a mode for reducing power consumption, the functional module changes at least part of the processing for providing the function in order to reduce power consumption. For example, for a functional module that normally executes predetermined processing every 30 seconds, power consumption can be reduced by changing the processing interval to one minute.

Thus, assigning an appropriate execution mode to each of the functional modules can reduce the power consumption of the DCM 100.

Assigning an execution mode to a functional module is synonymous with assigning an execution mode to a set of processing for providing a function.

The storage unit 102 stores a mode list 102A. FIG. 3B is a schematic diagram of the data stored in the storage unit 102.

The mode list 102A is a list of execution modes to be assigned to the multiple functional modules of the DCM 100. FIG. 4 illustrates an example of the mode list 102A. In the mode list 102A, the execution modes to be assigned to the multiple functional modules of the DCM 100 are associated with the remaining battery level.

In the illustrated example, the emergency alert function is provided independently of the remaining battery level. The security function and the remote control function are provided when the remaining battery level exceeds 20%. The data transmission function is provided when the remaining battery level exceeds 50%. The software update function is provided when the remaining battery level exceeds 80%.

In FIG. 4, the two modes, "normal" and "suspended," are illustrated as examples; however, other execution modes may also be defined. For example, other modes for suppressing power consumption can be added to the execution modes. Examples of methods of suppressing power consumption include a method in which the processing execution cycle is made longer than normal, a method in which the priority of the processing is lowered, and a method in which the duration of the processing is made shorter than normal.

Referring back to FIG. 2, the ECUs 200 will be described.

The ECU 200 is an electronic control unit that controls the components of the vehicle 10. There may be more than one ECU 200 included in the vehicle 10. The multiple ECUs 200 may, for example, be used to control components of different systems, such as an engine system, an electrical system, and a powertrain system. The ECU 200 includes the function of generating defined messages and transmitting and receiving them periodically via the in-vehicle network.

In addition, the ECU 200 can provide a predetermined service by communicating with an apparatus in an external network (e.g., the server apparatus 20) via the DCM 100. Examples of predetermined services include a remote service (e.g., a remote air conditioning service), a security monitoring service, a service for providing a link to smart homes, and an automatic parking service.

Also, the ECU 200 may control an in-vehicle apparatus (e.g., a car navigation apparatus) that provides information to vehicle occupants. The in-vehicle apparatus is an apparatus that provides information to the vehicle occupants and is also called a car navigation system, an infotainment system, or a head unit. This can provide navigation and entertainment to the occupants of the vehicle. The ECU 200 may also download traffic information, road map data, music, videos, images, and the like via the external network.

The ECU 200 may be, like the DCM 100, a computer including a processor such as a CPU or GPU, a main memory, such as RAM or ROM, and an auxiliary storage, such as an EPROM, disk drive, or removable medium.

Each ECU 200 includes a controller 201, a storage unit 202, and a communication unit 203.

The controller 201 is an arithmetic unit (processor) that performs various functions of the ECUs 200 by executing a predetermined program. The storage unit 202 is a memory device that includes a main memory and an auxiliary storage.

The communication unit 203 is a communication interface for connecting the ECUs 200 to the in-vehicle network. The communication unit 203 executes processing for transmitting messages in a predetermined format generated by the controller 201 to the network bus 400, and processing for transmitting messages received from the network bus 400 to the controller 201.

This embodiment illustrates ECU 200A, ECU 200B, and ECU 200C as the ECUs 200 installed in the vehicle 10. In this embodiment, the ECU 200A is the ECU that manages the electrical system of the vehicle 10. The ECU 200A is capable of acquiring data on the remaining battery level of the vehicle 10 and providing it to the DCM 100. The ECUs 200B and 200C are the ECUs that control components other than the electrical system. Examples of such ECUs include engine ECUs and powertrain ECUs.

The network bus 400 is a communication bus that constitutes the in-vehicle network. Although this example illustrates only a single bus, the vehicle 10 may include more than one communication bus.

Figure 5:
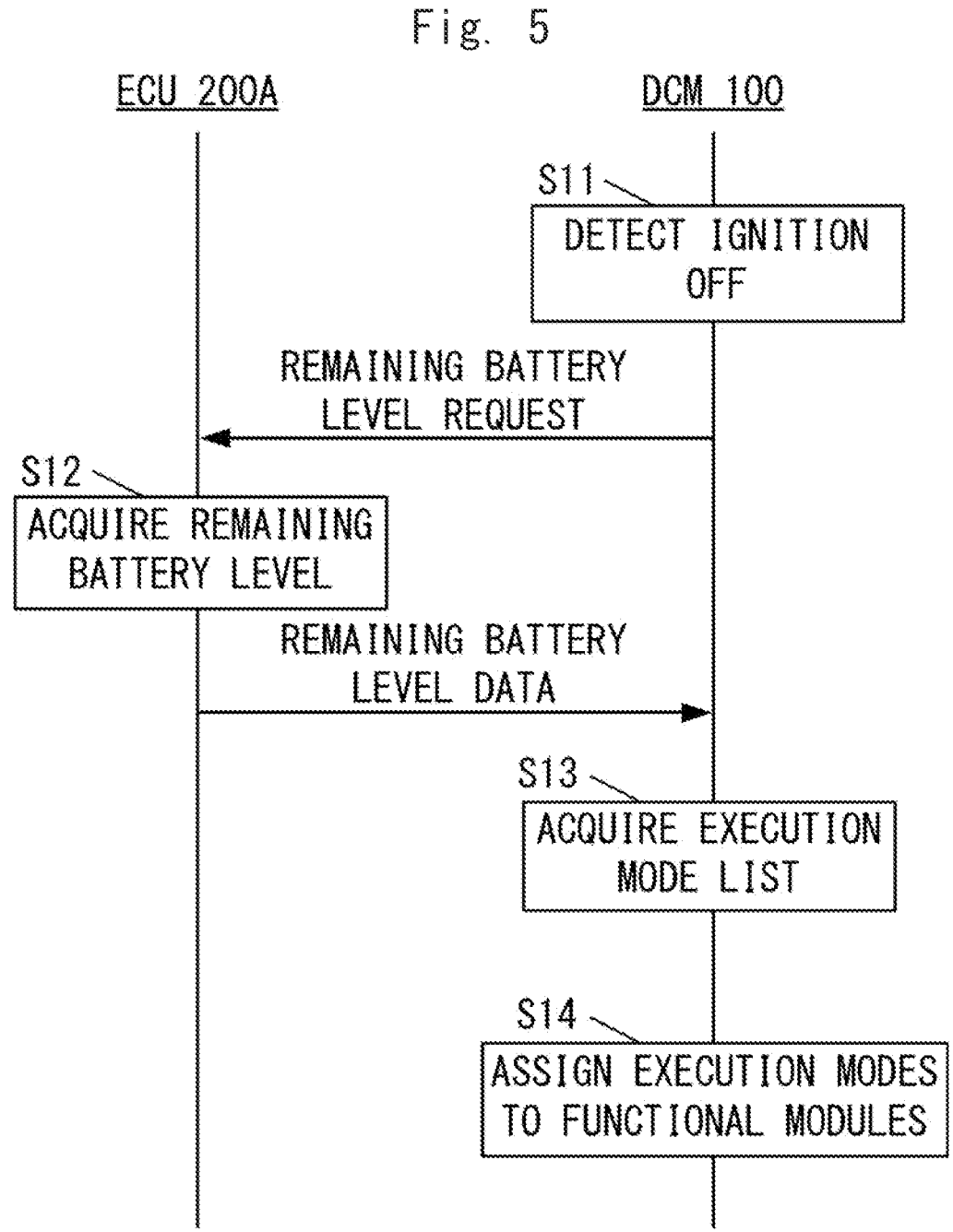
FIG. 5 is a flow diagram of processing in the first embodiment.

Next, the flow of the processing performed by the components included in the vehicle system according to this embodiment will be explained. FIG. 5 is a flow diagram of processing executed by the DCM 100 and the ECU 200A.

First, in Step S11, the DCM 100 of the vehicle 10 (mode management unit 1017) detects the fact that the ignition of the vehicle has been turned off. When detecting the fact that the ignition of the vehicle has been turned off, the mode management unit 1017 transmits the ECU 200A the data for requesting the acquisition of the remaining battery level of its vehicle (remaining battery level request).

In Step S12, the ECU 200A acquires the remaining battery level of its vehicle in response to the remaining battery level request. The ECU 200A generates data indicating the remaining battery level (remaining battery level data) and transmits the data to the DCM 100. Remaining battery level can be expressed, for example, by a value such as state of charge (SOC).

Next, in Step S13, the mode management unit 1017 refers to the mode list 102A to acquire a list of execution modes corresponding to the remaining battery level.

For example, in the example illustrated in FIG. 4, when the remaining battery level of the vehicle is 45%, the following execution modes are acquired.

Emergency alert function: normal

Security function: normal

Remote control function: normal

Vehicle data collection/transmission function: suspended

Software update function: suspended

Next, in Step S14, the acquired execution mode is assigned to each functional module. In the aforementioned example, the mode management unit 1017 commands the emergency alert unit 1012, the security management unit 1013, and the remote control unit 1014 to operate in the "normal mode". It also commands the data collection unit 1015 and the updating unit 1016 to be "suspended".

Each functional module starts operating according to its assigned execution mode. For example, when the execution mode assigned to a certain functional module is "suspended," the functional module stops processing for providing its function.

In this example, the "suspended" mode is illustrated as a mode for suppressing power consumption; however, other power-saving modes may also be defined. For example, as illustrated in FIG. 6A, modes for changing the execution cycle of processing or the duration of processing may be defined.

In either case, the execution mode is designated so that the total processing time is shortened (i.e., power consumption is reduced) as the remaining battery level decreases.

Figure 6B:
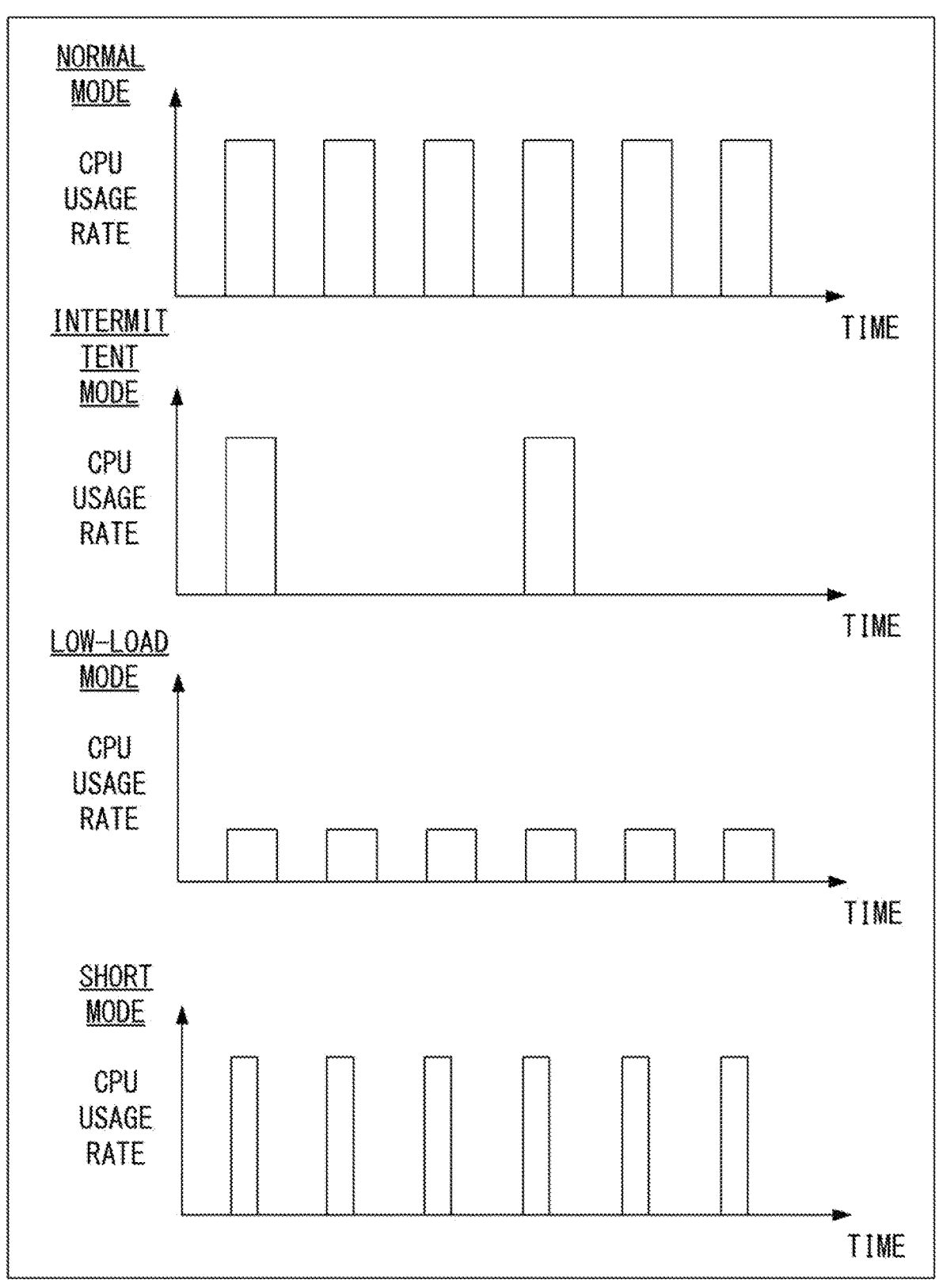
FIG. 6B is a diagram for explaining the power-saving mode in the first embodiment.

FIG. 6B is graphs for explaining a specific method of suppressing power consumption.

For example, when there is an ECU 200 that repeats processing in a predetermined cycle to provide a certain function in the normal operating mode, power consumption can be suppressed by changing the operating mode. For example, the operation cycle of processing may be made longer than normal, as in the intermittent mode, or a lower-load processing may be executed as in the low-load mode. Also, the duration of each time of processing may be shortened as in the short mode.

Furthermore, power consumption can be suppressed by suppressing communication. For example, a mode may be defined for each functional module to lower the priority of communication, or to make the output of wireless communication lower than normal.

Figure 7:
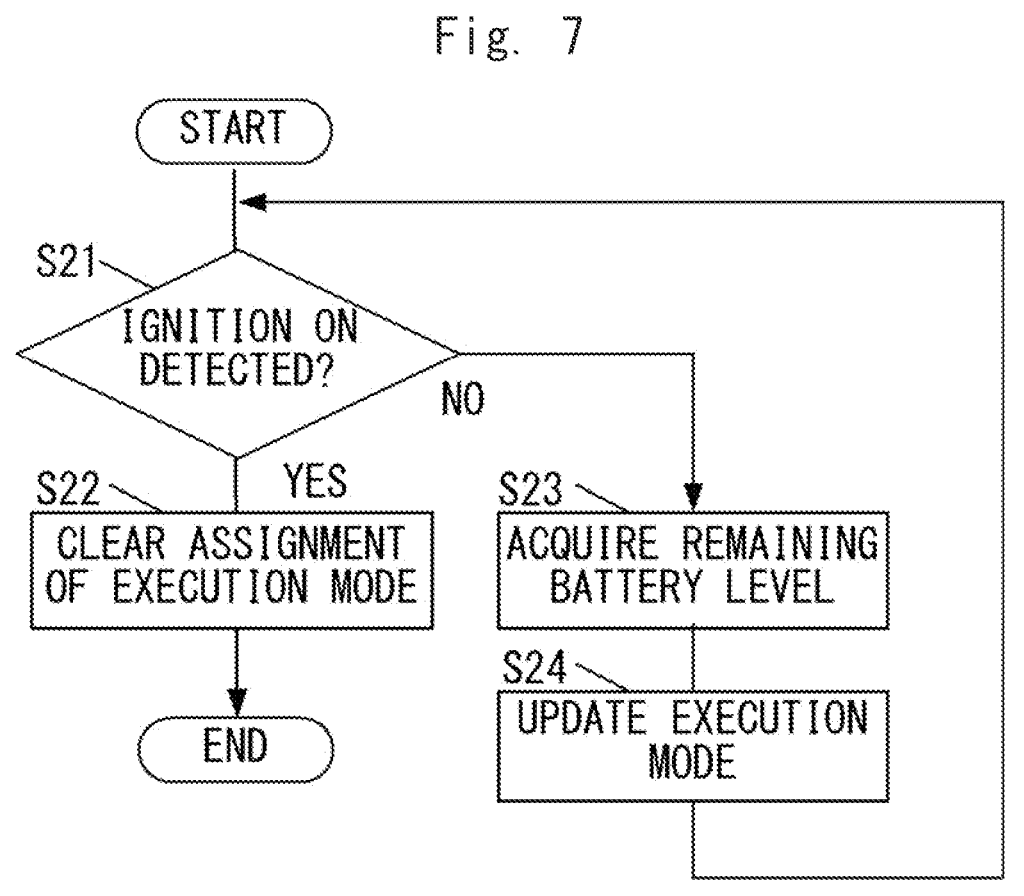

FIG. 7 is a flowchart of processing executed when the ignition of the vehicle 10 is off (i.e., while the vehicle 10 is parked).

First, in Step S21, the DCM 100 (mode management unit 1017) determines whether the ignition of the vehicle has been turned on. Upon detection of the fact that the ignition has been turned on, the process proceeds to Step S22.

In Step S22, the mode management unit 1017 clears assignment of the execution modes to the multiple functional modules. This allows each functional module to return to the normal execution mode.

For example, when there is a functional module that has suspended processing, the processing is restarted in this step. In other words, the execution of processing by the functional module is postponed until the running system of the vehicle 10 is restarted.

When the ignition of the vehicle is not on in Step S21, the process proceeds to Step S23 where the battery status of the vehicle 10 is monitored.

To be specific, in Step S23, the mode management unit 1017 issues the remaining battery level request to the ECU 200A to request for acquisition of the remaining battery level. Through the same processing as in Step S12, the ECU 200A acquires the remaining battery level and returns the remaining battery level data as a response.

Next, in Step S24, the mode management unit 1017 updates the execution mode through the same processing as in Steps S13 and S14. For example, when the remaining battery level drops while the vehicle is parked, the execution modes assigned to the functional modules are changed.

For example, when the remaining battery level falls below 20% while the vehicle is parked, the processing for providing the remote control function stops.

When the vehicle 10 is an electric vehicle or a plug-in hybrid vehicle, the remaining battery level may be recovered by charging it while the vehicle is parked. In this case also, the execution modes assigned to the functional modules are also changed according to the mode list 102A. For example, when the remaining battery level exceeds 20% due to charging, the processing for providing the remote control function is restarted.

As explained above, in the first embodiment, based on the remaining battery level of the vehicle 10, the execution modes of the multiple functional modules executed by the DCM 100 are switched. While the conventional technology can only switch the modes on an electronic control unit basis, the vehicle system according to this embodiment can switch the modes on a function basis. This makes it possible to maintain more important functions until just before the battery runs out, and to stop less important functions in an earlier stage.

Second Embodiment

In the first embodiment, an execution mode is designated on a functional module basis. In contrast, in a second embodiment, an execution mode is designated for each type of data to be transmitted and received.

FIG. 8 illustrates an example of a mode list in the second embodiment.

As illustrated in the drawing, in this embodiment, an execution mode is assigned for each type of data to be transmitted and received. For example, when the data to be transmitted and received is data related to an emergency alert, communication is permitted regardless of the remaining battery level. When the data to be transmitted/received is security-related data, communication is permitted only when the remaining battery level exceeds 20%.

In this embodiment, the mode management unit 1017 notifies each functional module of the execution mode for each type of data, and each functional module controls its transmission and reception according to the execution mode corresponding to the target data. For example, the security management unit 1013 stops transmission and reception of security-related data when the remaining battery level is below 20%.

Although a mode in which communication is permitted and a mode in which communication is blocked have been illustrated in this embodiment, execution modes may be broken into smaller ones. For example, the execution interval of communication, the duration of communication, and the limit on the amount of data transmitted and received at once may be defined in detail. For example, the example illustrated in FIG. 6B illustrates the CPU usage rates, but "CPU usage rate" may be replaced with "data communication rate" or the like. For example, the communication interval may be made longer than normal, or the communication priority may be reduced. The amount of data transmitted and received per unit of time may also be reduced.

According to the second embodiment, for each type of data, it is possible to specify whether or not to permit the transmission and reception of such data, and when it is permitted, the interval between transmission and reception, the communication rate, the priority level, or the data amount can be designated.

Third Embodiment

In the first and second embodiments, the DCM 100 assigns an execution mode for each of the functions provided by its apparatus. Meanwhile, the DCM 100 is not an only apparatus that can operate while the vehicle 10 is parked. For example, in some cases, multiple ECUs 200 operate while the vehicle 10 is parked.

To address this, in a third embodiment, for each of the functions provided by the multiple ECUs 200, the DCM 100 assigns an execution mode while the vehicle is parked, and the ECU 200 operates according to the assigned execution mode.

In the third embodiment, the mode list 102A contains execution modes to be assigned to the functions provided by the multiple ECUs 200. FIG. 9 illustrates an example of the mode list 102A according to the third embodiment. In the illustrated example, in addition to the execution modes corresponding to the functional modules of the DCM 100, the execution modes corresponding to the functions provided by the ECUs 200B and 200C are defined.

In the third embodiment, the mode management unit 1017 generates commands to the ECUs 200 based on the mode list 102A.

Figure 10:
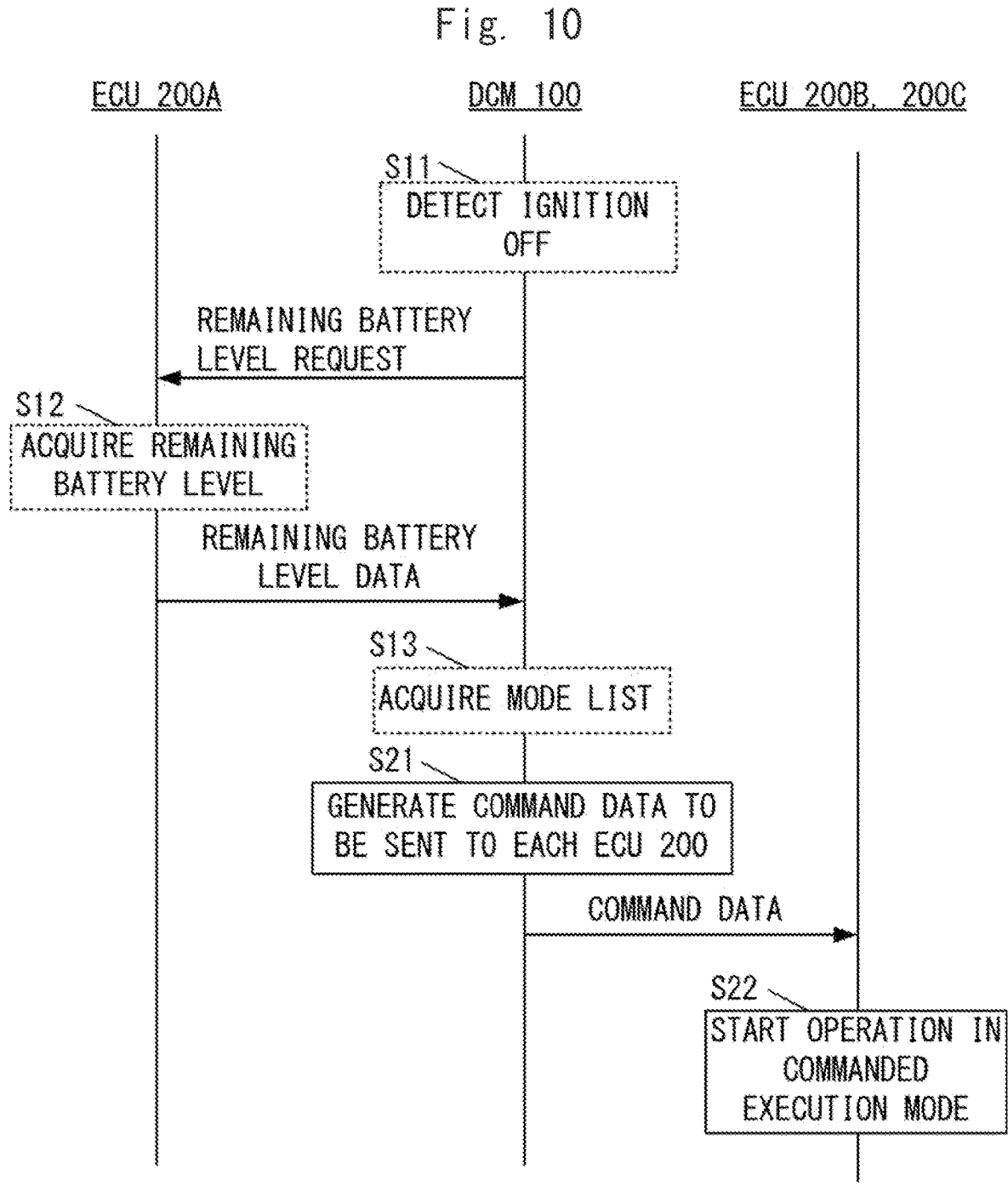
FIG. 10 is a flow diagram of processing in the third embodiment.

FIG. 10 is a flow diagram of processing executed by the DCM 100 and the ECU 200B (200C) in the third embodiment. Although the ECUs 200B and 200C are illustrated as the ECUs 200 that receive the commands here, any other ECUs 200 may receive commands.

The processing steps similar to those in the first embodiment are indicated by dotted lines and their explanation will be omitted.

When the DCM 100 acquires the mode list in Step S13, the process proceeds to Step S21 where the mode management unit 1017 generates command data to be transmitted to each ECU 200 according to the mode list 102A. The command data is data for assigning an execution mode to one or more functions provided by the target ECU 200.

For example, when the remaining battery level of the vehicle is 30%, the mode management unit 1017 transmits command data representing the message "provide a function B1 as normal and suspend processing for providing a function B2" to the ECU 200B. Similarly, it transmits command data representing the message "provide a function C1 as normal and suspend processing for providing a function C2" to the ECU 200C.

In Step S22, the ECU 200 receiving the command data starts operating according to the command data. The method is the same as in Step S14.

In the third embodiment also, the processing illustrated in FIG. 7 is executed by the DCM 100 (mode management unit 1017) while the vehicle is parked. The execution mode is updated by transmitting the command data to each ECU 200.

As explained above, according to the third embodiment, also for the functions provided by the multiple ECUs 200, the execution modes can be changed while the vehicle is parked.

(Modification)

The aforementioned embodiments are merely illustrative, and this disclosure may be modified and implemented as appropriate without departing from the scope of this disclosure.

For example, the processing and means explained in this disclosure may be freely combined and implemented as long as no technical contradictions arise.

Although the case where a single bus is used in an in-vehicle network is illustrated in the description of the embodiments, there may be multiple buses in the in-vehicle network. In this case, the DCM 100 or a gateway that coordinates multiple communication buses may relay communication between the multiple buses. Furthermore, the DCM 100 may assign the execution modes to the functions provided by the gateway.

The processing that has been described as being performed by one apparatus may be shared and executed by multiple apparatuses. In contrast, the processing that has been described as being performed by different apparatuses may be performed by a single apparatus. In a computer system, what hardware configuration (server configuration) is used to achieve each function can be flexibly changed.

This disclosure can be implemented by providing a computer with a computer program implementing the functions that have been explained in the aforementioned embodiments, and by one or more processors included in the computer reading and executing the program. Such a computer program may be provided to the computer by a non-transitory computer readable storage medium that can be connected to the system bus of the computer, or may be provided to the computer via a network. Examples of the non-transitory computer-readable storage media include magnetic disks (e.g., floppy (registered trademark) disks and hard disk drives (HDDs)), optical discs (e.g., CD-ROM, DVD discs, and Blu-ray discs) and any other types of discs, read-only memory (ROM), random-access memory (RAM), EPROM, EEPROM, magnetic cards, flash memory, optical cards, and any types of media suitable for storing electronic commands.

What is claimed is:

1. An information processing apparatus comprising a controller including at least one processor configured to:

acquire information on a remaining battery level of a vehicle; and determine, based on the remaining battery level, an execution mode to be set after a running system of the vehicle stops for:

each individual electronic control unit of a plurality of electronic control units of the vehicle, each individual electronic control unit of the plurality of electronic control units being configured to perform processing of multiple functions, and each functional module of multiple functional modules of a data communication module of the vehicle, the multiple functional modules being associated with the plurality of electronic control units, wherein the execution mode establishes a designated operation state for each function performed by each individual electronic control unit of the plurality of electronic control units, wherein the execution mode includes at least one of a first mode in which execution of corresponding processing is permitted and a second mode in which the execution of the corresponding processing is not permitted, wherein the execution mode for each functional module of the multiple functional modules is determined based on a type of target data transmitted to and received from each functional module of the multiple functional modules, and wherein the at least one processor is further configured to determine, for a predetermined functional module of the multiple functional modules, the first mode as the execution mode to be set regardless of the remaining battery level, the predetermined functional module being determined based on the type of the target data transmitted to and received from each functional module of the multiple functional modules.

2. The information processing apparatus according to claim 1, wherein the controller acquires the information from an electronic control unit managing a battery of the vehicle, of the plurality of electronic control units.

3. The information processing apparatus according to claim 2, wherein the controller determines the execution mode for each functional module of the multiple functional modules based on data associating a relationship between the remaining battery level and the execution mode with each of the type of the target data, and wherein the controller determines the execution mode for each function of each individual electronic control unit of the plurality of electronic control units based on data associating a relationship between the remaining battery level and the execution mode with each function performed by each individual electronic control unit of the plurality of electronic control units.

4. The information processing apparatus according to claim 3, wherein the target data is data in which the execution mode is defined so that the lower the remaining battery level is, the less power consumption by the plurality of electronic control units is.

5. The information processing apparatus according to claim 1, wherein the controller stops execution of processing to which the second mode is assigned, during a period when the running system of the vehicle is stopped.

6. The information processing apparatus according to claim 1, wherein the controller postpones execution of processing to which the second mode is assigned, until the running system is restarted.

7. The information processing apparatus according to claim 1, wherein the apparatus is installed in the vehicle and capable of providing a predetermined connected service.

8. The information processing apparatus according to claim 7, wherein the execution mode includes at least one of the first mode, the second mode, and a third mode in which frequency of communication with an external apparatus is made lower than in the first mode.

9. A vehicle system comprising a first device comprising one or more processors configured to perform multiple types of processing related to a vehicle and a second device comprising one or more processors configured to acquire information on a remaining battery level of the vehicle, wherein the one or more processors of the second device are configured to transmit the information on the remaining battery level of the vehicle to the first device, and the one or more processors of the first device are configured to determine, based on the remaining battery level, an execution mode to be set after a running system of the vehicle stops for;

each individual electronic control unit of a plurality of electronic control units of the vehicle, each individual electronic control unit of the plurality of electronic control units being configured to perform processing of multiple functions, and each functional module of multiple functional modules of a data communication module of the vehicle, the multiple functional modules being associated with the plurality of electronic control units, wherein the execution mode establishes a designated operation state for each function performed by each individual electronic control unit of the plurality of electronic control units, wherein the execution mode includes at least one of a first mode in which execution of corresponding processing is permitted and a second mode in which the execution of the corresponding processing is not permitted, wherein the execution mode for each functional module of the multiple functional modules is determined based on a type of target data transmitted to and received from each functional module of the multiple functional modules, and wherein the one or more processors of the first device are further configured to determine, for a predetermined functional module of the multiple functional modules, the first mode as the execution mode to be set regardless of the remaining battery level, the predetermined functional module being determined based on the type of the target data transmitted to and received from each functional module of the multiple functional modules.

10. The vehicle system according to claim 9, further comprising a storage configured to store data associating a relationship between the remaining battery level and the execution mode with each of the type of the target data and with each function performed by each individual electronic control unit of the plurality of electronic control units.

11. The vehicle system according to claim 10, wherein the target data is data in which the execution mode is defined so that the lower the remaining battery level is, the less power consumption by an electronic control unit managing a battery of the vehicle, of the plurality of electronic control units, is.

12. The vehicle system according to claim 9, wherein the first apparatus stops execution of processing to which the second mode is assigned, during a period when the running system of the vehicle is stopped.

13. The vehicle system according to claim 9, wherein the first device postpones execution of processing to which the second mode is assigned, until the running system is restarted.

14. The vehicle system according to claim 9, wherein the first device is installed in the vehicle and configured to provide a predetermined connected service.

15. The vehicle system according to claim 14, wherein the execution mode includes at least one of the first mode, the second mode, and a third mode in which frequency of communication with an external apparatus is made lower than in the first mode.

16. An information processing method comprising:

acquiring information on a remaining battery level of a vehicle; and determining, based on the remaining battery level, an execution mode to be set after a running system of the vehicle stops for;

each individual electronic control unit of a plurality of electronic control units of the vehicle, each individual electronic control unit of the plurality of electronic control units being configured to perform processing of multiple functions, and each functional module of multiple functional modules of a data communication module of the vehicle, the multiple functional modules being associated with the plurality of electronic control units, wherein the execution mode establishes a designated operation state for each function performed by each individual electronic control unit of the plurality of electronic control units, wherein the execution mode includes at least one of a first mode in which execution of corresponding processing is permitted and a second mode in which the execution of the corresponding processing is not permitted, wherein the execution mode for each functional module of the multiple functional modules is determined based on a type of target data transmitted to and received from each functional module of the multiple functional modules, and wherein the information processing method further comprises determining, for a predetermined functional module of the multiple functional modules, the first mode as the execution mode to be set regardless of the remaining battery level, the predetermined functional module being determined based on the type of the target data transmitted to and received from each functional module of the multiple functional modules.

17. The information processing method according to claim 16, wherein the information is acquired from an electronic control unit managing a battery of the vehicle, of the one or more electronic control units.

18. The information processing method according to claim 17, wherein the execution mode for each functional module of the multiple functional modules is determined based on data associating a relationship between the remaining battery level and the execution mode with each of the type of the target data, and wherein the execution mode for each function of each individual electronic control unit of the plurality of electronic control units is determined based on data associating a relationship between the remaining battery level and the execution mode with each function performed by each individual electronic control unit of the plurality of electronic control units.

\* \* \* \* \*